(No Model.)
C. S. HOWARD.
FENCE WIRE REEL CARRIER.
No. 495,156. Patented Apr. 11, 1893.
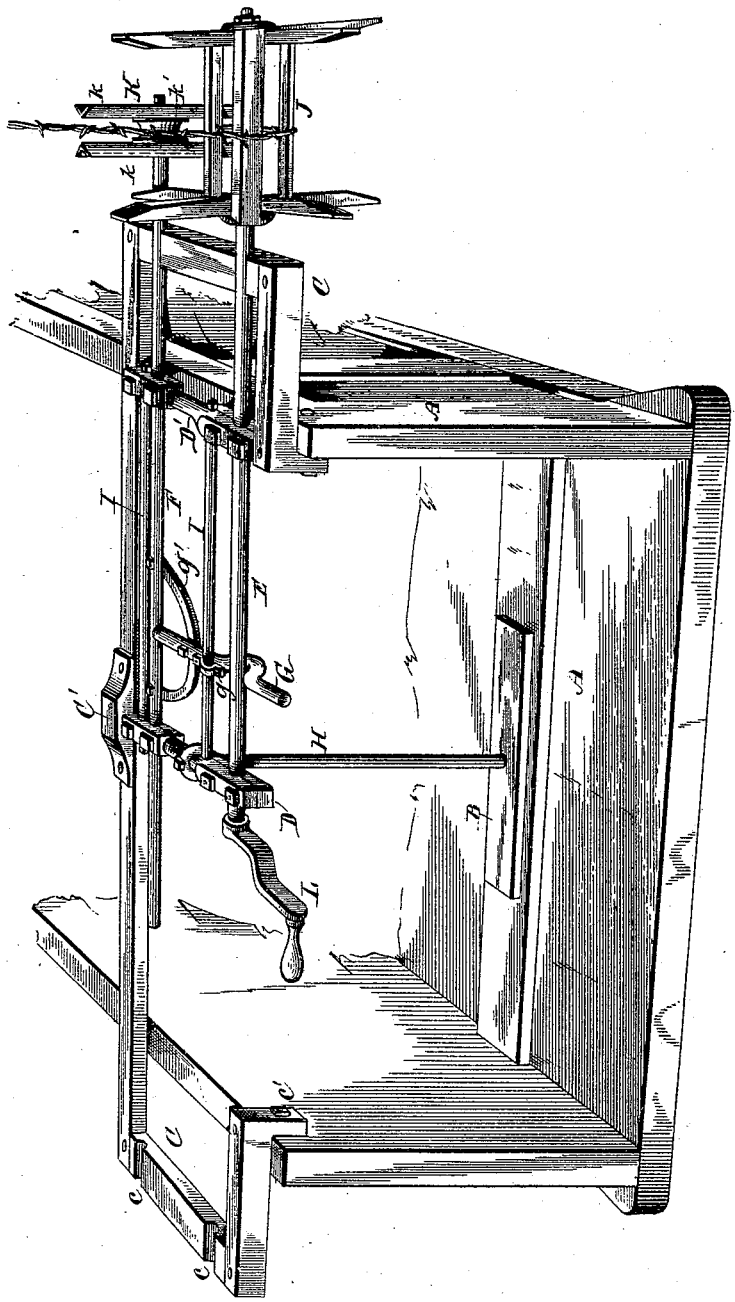
Witnesses:
Inventor:
Chafin S. Howard
By J. M. St. John,
Atty.

UNITED STATES PATENT OFFICE.

CHAFIN S. HOWARD, OF MONROE, IOWA.

FENCE-WIRE-REEL CARRIER.

SPECIFICATION forming part of Letters Patent No. 495,156, dated April 11, 1893.

Application filed January 23, 1893. Serial No. 459,471. (No model.)

*To all whom it may concern:*

Be it known that I, CHAFIN S. HOWARD, a citizen of the United States, residing at Monroe township, in the county of Linn and State of Iowa, have invented certain new and useful Improvements in Fence-Wire-Reel Carriers; and I do hereby declare the following to be a full, clear, and exact description of the invention, such as will enable others skilled in the art to which it appertains to make and use the same.

The object of this invention is to provide a simple and efficient device for reeling up old fence wire and the like; and the invention consists in the construction, combination and arrangement of appliances to this end, as will be hereinafter fully set forth and claimed.

The accompanying drawing represents a rear view of a machine embodying my invention attached to the rear end of an ordinary wagon box.

Similar letters of reference indicate like parts.

Referring now to the drawing, A is the box of a common lumber wagon, in the bottom of which is a support or bearing B for a standard H. To the top of the box is suitably secured, as by bolts c', a frame C. This frame is provided with a central bearing C' to take the end of the pivot-bar D, which is also mounted to turn in a suitable bearing at the upper end of the standard H. In this bar are mounted two shafts E, and F, which have bearings also in a bar D', connected to pivot-bar D by rods I I. The end pieces of the frame are also provided with bearings c c, to receive the shafts E and F. One end of the shaft E is adapted to hold the reel J, and the other end is provided with a crank L, by means of which the reel is turned to reel up the wire.

To one end of the shaft F is secured a guide K, consisting of the flared plates k k, between which the barbed wire may pass without catching, and a sheave k' over which the wire moves freely in passing to the reel. About midway the shaft is provided with a handle G, by means of which the guide is moved back and forth as the wire is wound up, to distribute it evenly along the reel. The handle is provided with a suitable brace g', and has a bearing g adapted to slip on one of the tie rods I I connecting the bars D and D'.

The operation of the machine will now be understood. The free end of the wire is connected with the reel in the usual way, the reel as illustrated being on the right side of the wagon, and extending so far out as to permit the easy passing of the wagon and team along by the side of the fence. The wire being detached from the posts, the operator in the rear end of the wagon with one hand turns the reel-shaft, winding up the wire on the reel, and with the other hand moves the guide back and forth to distribute it smoothly and evenly. When at the end of the fence, or when for any reason it is desired to go in the opposite direction, the position of the reel is simply shifted, by turning it on the central pivot D, it being understood that the bar D' is not connected in any manner with the frame C.

The device has been found to be well adapted to the purpose, and affords a convenient and practical means for disposing of fence wire, as is frequently necessary in the rebuilding of farm fences.

As ordinarily performed, the operation is extremely laborious and slow, and is not without danger, all of which difficulties I seek to avoid by the use of the simple machine described.

Having thus described my invention, I claim—

1. In a wire reel-carrier of the class specified, the combination of a reel shaft adapted to take a reel at the outer end, a pivot bar forming an inner bearing for said shaft, an outer bearing for the shaft, and a support for the pivot-bar suitably connected with a wagon, whereby the position of the reel may be shifted from one side to the other of the wagon, as specified.

2. In a wire reel-carrier the combination with the wagon box A, of the frame C having middle bearing C' the standard H, the movable frame composed of the bars D D' and tie-rods I I, which frame is adapted to turn on the bearings for the pivot-bar D, the shaft E, reel J and crank L, all substantially as and for the purpose set forth.

3. In a reel-carrier of the class specified, the combination with suitable supports therefor, of the tilting frame D D' I I, the reel shaft E, with its crank L and reel J, and the longitudinally movable shaft F with its connected shift-lever G and guide K, substantially as and for the purpose set forth.

4. The combination of the tilting frame D D' I I, with reel and guide shafts mounted therein, the standard H, and the frame C having middle bearing C' for the pivot-bar D and open bearings $c\ c$ to form outer supports for the said shafts, substantially as described.

In testimony whereof I affix my signature in presence of two witnesses.

CHAFIN S. HOWARD.

Witnesses:
JOSEPH KUBICEK,
L. A. ST. JOHN.